March 8, 1955 R. G. BAKER 2,703,536
MACHINE FOR PRODUCING FRUIT PIES
Filed Nov. 19, 1952 2 Sheets-Sheet 1
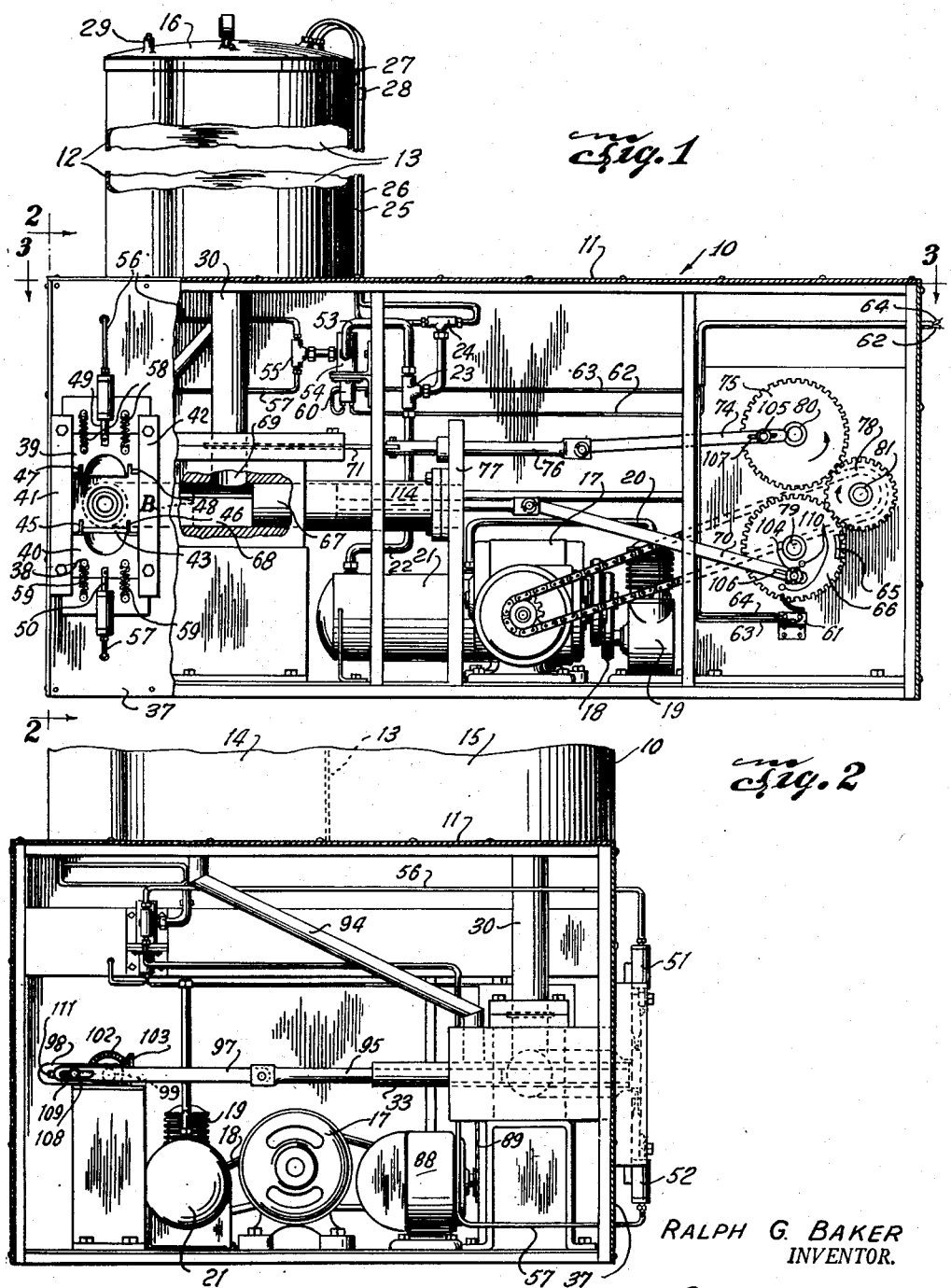
RALPH G. BAKER
INVENTOR.
ATTORNEY March 8, 1955 R. G. BAKER 2,703,536
MACHINE FOR PRODUCING FRUIT PIES
Filed Nov. 19, 1952 2 Sheets-Sheet 2

RALPH G. BAKER
INVENTOR.

BY
ATTORNEY

United States Patent Office 2,703,536
Patented Mar. 8, 1955

2,703,536

MACHINE FOR PRODUCING FRUIT PIES

Ralph G. Baker, Dallas, Tex., assignor to Spee-Dee Corporation of Texas, Dallas, Tex., a corporation of Texas Application November 19, 1952, Serial No. 321,303

5 Claims. (Cl. 107—1)

This invention relates to an apparatus for preparing a food product and more particularly to an apparatus for producing pastries or the like filled with a filler such as fruit or the like.

An object of the invention is to provide a new and improved apparatus for producing pastries or the like having a filler.

Another object of the invention is to provide a new and improved apparatus for automatically producing pastries having a filler.

Still another object of the invention is to provide a new and improved apparatus for making pastries wherein predetermined amounts of filler are intermittently ejected into a continuously extruded tube of dough and wherein successive portions of the dough are closed and cut off to form individual filled pastries.

With the foregoing objects in view, the invention has further reference to certain features of accomplishment which will become apparent as the description proceeds, taken in connection with the accompanying drawings wherein:

Figure 1 is a side plan view, with certain portions broken away to reveal operative elements of the apparatus, of a preferred form of the apparatus for making pastries;

Figure 2 is a vertical sectional view taken on the line 2—2 of Figure 1;

Figure 3:
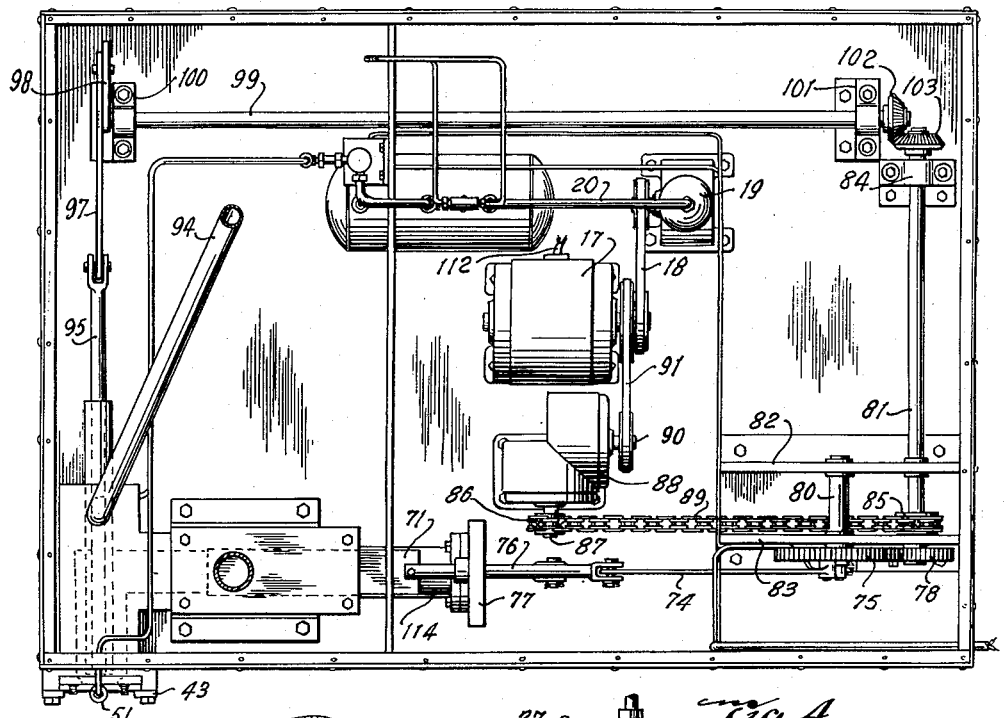
Figure 3 is a horizontal sectional view taken on the line 3—3 of Figure 1.

Referring now to the drawing, the apparatus comprises a cabinet 10 having a top deck 11 on which is mounted a tank 12 divided by a partition 13 into two chambers 14 and 15. The tank is provided with a lid 16 which closes both chambers and hermetically seals the top of the tank and the partition 13 so that different pressures may be maintained in the two chambers 14 and 15.

Mounted within the cabinet is a motor 17 which is connected by a belt and pulley transmission 18 to a compressor 19. The outlet of the compressor is connected through a conduit 20 to the inlet of a compressor storage tank 21. The outlet of the storage tank is connected to the chambers 14 and 15 of the tank 12 through conduit 22, T connections 23 and 24, and the conduits 25 and 26, which are connected to suitable inlets in the lid on opposite sides of the partition 13, to the chambers 15 and 14, respectively. Pressure regulating valves 27 and 28 are connected in the conduits 25 and 26 so that the pressures in the chambers 15 and 14 may be set and maintained at predetermined values. Ordinarily, the pressure in chamber 15, which contains dough as will be explained below, is maintained at a higher value than the pressure in chamber 14. Suitable safety valves 29, one of which can be seen in Figure 1, are provided on lid 16 to relieve the pressures in the chambers 14 and 15 should it rise to dangerous values.

An outlet pipe 30 connects the bottom of the chamber 15 to an extrusion chamber 31 of an extrusion member 32. A cylindrical filler extrusion tube 33 extends longitudinally through the extrusion member 32, the extrusion chamber 31, and the extrusion orifice 34 of a plate 35 disposed over an aperture 36 in the side plate 37 of the cabinet 10. The extrusion orifice is of smaller radius than the extrusion chamber 31 so that the dough forced through orifice 34 is compressed in passing therethrough.

A cutting and dough shell or tube closing mechanism 38 is mounted on the plate 35 and includes a pair of reciprocating plates 39 and 40 which slide between the plate 35 and the undercut guide runners 41 and 42 disposed on opposite sides of and overlapping the reciprocating plates.

The lower reciprocating plate 40 is provided with a knife 43 which is adapted to enter into a slot 44 in the lower edge of the upper reciprocating plate. A pair of guide pins 45 and 46 on the lower reciprocating plate are adapted to engage in the slots 47 and 48, respectively, of the upper reciprocating plate to keep the two plates in alignment as they approach each other.

The two reciprocating plates are forced toward each other by the pistons 49 and 50 of the pneumatic rams 51 and 52, respectively, which are supplied with compressed air from the storage tank 21 through the conduit 22, T connection 23, conduit 53, the solenoid operated valve 54, T connection 55, and the conduits 56 and 57. The reciprocating plates are yieldingly biased away from each other by the springs 58 and 59.

The solenoid 60 of the valve 54 is connected to any suitable source of current through a normally open switch 61 connected in series with the solenoid by the conductors 62, 63 and 64. The conductors 62 and 64 are brought out through a suitable aperture in one side of the cabinet. The switch 61 is closed periodically by a lug 65 and a gear 66 as will be more fully explained below.

The dough from the chamber 15 of the tank 12 is forced into the extrusion chamber 31 of the extrusion member 32 by a piston 67 slidably disposed in a bore 68 of the extrusion member which communicates both with the extrusion chamber and the vertical bore 69 of the extrusion member. The dough piston 67 is reciprocated by a link 70 whose opposite ends are pivotally connected to the piston and to the gear 66.

A closure member 71 is slidably mounted between two closure plates 72 and 73 which have registering apertures aligned with the pipe 30 and the vertical bore 69 and which are mounted on the extrusion member 32. The lower end of the pipe 32 is secured to the upper closure plate in any suitable manner. The closure member is employed to close the pipe 30 and prevent upward movement of the dough from the vertical bore 69 into the pipe 30 when the dough piston 67 moves inwardly to force dough into the extrusion chamber.

The closure member is reciprocated by a link 74 whose opposite ends are pivotally connected to a gear 75 and to one end of a sliding rod 76 journaled in a vertical support plate 77. The opposite end of the sliding rod 76 is rigidly secured to the closure member 71.

The two gears 66 and 75 are rotated in the directions indicated by the arrows (Fig. 1) by a gear 78. The gears 66, 75 and 78 are mounted on shafts 79, 80 and 81, respectively. The shafts 79 and 80 are journaled in the supporting plates 82 and 83, while the shaft 81 is journaled not only in the plates 82 and 83 but also in a pillow block 84. The shaft 81 is provided with a sprocket 85 which is connected to the sprocket 86 on the driving shaft 87 of a speed changer 88 by a chain 89. The driving shaft 90 of the speed changer is connected to the motor 17 by a belt and pulley transmission 91. The speed changer is employed to reduce the speed of rotation of the shaft 81.

The filler extrusion tube 33 is provided with a lateral port 92 which communicates with a second vertical bore 93 in the extrusion member 32. A conduit 94 connects the bottom of the chamber 14 of the tank 12 with the bore 93.

A piston 95 is slidably mounted in the filler extrusion tube and intermittently opens the lateral port 92 to permit filler to move into the tube and then forces it through the end of the tube adjacent the closing and cutting mechanism. This end of the tube is provided with a dam 96 which prevents any filler liquid which might be in the filler extrusion tube from flowing out of the extrusion tube at any time except when the piston 95 is moving forwardly.

The piston 95 is reciprocated by a link 97 pivotally connected to the piston and to an arm 98 rigidly mounted on a shaft 99 journaled in pillow blocks 100 and 101. The shaft 99 is provided with a bevel gear 102 which meshes with a bevel gear 103 on the shaft 81 so that the piston 95 is moved back and forth in timed sequence with the movement of the dough piston 67, the closure member 71 and the reciprocating plates 39 and 40.

The links 70 and 74 are connected to the gears 66 and 75, respectively, by pins or bolts 104 and 105, respectively, which extend into elongate slots 106 and 107 in the links so that the dough piston and the closure member are stationary during certain stages of the revolution of the gears.

The link 97 is similarly connected to the arm 98 by a pin or bolt 108 which extends into the slot 109 in the link 97. The length of the stroke of the pistons 67 and 95 can be adjusted by placing the bolts or pins 104 and 108 in any one of the plurality of apertures 110 and 111 provided in the gear 66 and the arm 98, respectively.

In use, the chambers 14 and 15 are filled with a filler and with dough, respectively, and the lid is closed. The valves 27 and 28 are then adjusted so that the proper pressures are maintained in the two chambers. Ordinarily, a higher pressure will be maintained in the dough chamber 15 than in the filler chamber 14, since the filler ordinarily is less viscous than the dough.

The motor 17 is then started by connecting its terminals 112 to any suitable source of electric current. Assuming that the various elements of the apparatus are in the positions shown in Figures 1, 2 and 3, the gears 66 and 75 start to rotate in the directions indicated in Figure 1. The piston 67 will immediately commence to move to the left, Figure 1, forcing the dough in the bore 68 into the extrusion chamber and out through the extrusion orifice 34 in the plate 35 thus forming a hollow tube or shell whose outer end was previously closed by the reciprocating plates as will become apparent below. The closure member 71 and the filler piston will initially remain stationary since the pins 105 and 108 will slide in the slots 107 and 109, respectively, until the gear 75 and the arm 98 are rotated through predetermined angles to bring the pins 105 and 108 into contact with the ends of the slots.

The lengths of the slots 107 and 109 and the spacing of the pins 105 and 108 from the center of rotation of the gear 75 and the arm 98 are such that the filler piston will next commence moving inwardly to close the port 93 and to push the filler in the extrusion tube 33 out over the dam and into the dough tube or shell which is still being forced out of the extrusion chamber and the extrusion orifice by the dough piston 67. The slot 109 is of such length that the forward movement of the filler piston ceases while the forward movement of the dough piston is still going on.

When the gear 66 rotates to the position wherein the link 70 is moved upwardly to and past the horizontal, the forward movement of the piston 67 ceases but the dough in the extrusion chamber still being under some compression continues to flow or move out the extrusion chamber for a certain length of time and while the gear 66 continues to rotate. When the gear rotates to the position wherein the lug 65 closes the switch 61 and the solenoid 60 is energized to open the valve 54 and permit compressed air to flow to the pneumatic rams 51 and 52. The pistons 49 and 50 of the rams are moved outwardly forcing the reciprocating plates 39 and 40 toward each other. The edges of the plates engage opposite sides of the extruded dough tube or shell and force them together. The knife 41 cuts through the dough tube or shell and at the same time both cut ends of the dough shell are forced together so that the portion of the shell cut off has both ends closed about the filler while the end of the dough shell adjacent the extrusion orifice 34 is also closed.

While the reciprocating knives are closing and the pistons 67 and 95 are at rest, the slidable rod 76 is drawn back to move the closure member 71 to open position wherein it permits dough to flow, under the action of the compressed air in chamber 15, into the vertical bore 69 and thence, into the horizontal bore 68. When the closure member is in open position, the dough piston 67 moves rearwardly and tends to create a slight vacuum in the bore 68 which facilitates movement of the dough from the vertical bore into the horizontal bore.

At this time, the lug 65 moves past the switch 61 which opens to de-energize the solenoid 60 which permits the valve 54 to close to prevent further flow of compressed air into the pneumatic rams. The springs 58 and 59 then bring the reciprocating plates 39 and 40 back into open position, the pneumatic rams having conventional means permitting leakage of the air caught behind the pistons in the rams. Also, at this time, the filler rams are moved backward past the lateral port 93 of the extrusion tube and filler flows from the conduit 94 into the extrusion tube.

When the links 70 and 97 are moved back as far as they go, they will become stationary for periods of time determined by the lengths of their slots 106 and 109, respectively. When the pistons are stationary, the closure member is moved into closed position and the cycle of operation is completed. If the motor continues to operate, this cycle of operation is repeated.

It will be apparent that as the filler piston moves back, it creates a slight vacuum in the extrusion tube and therefore also in the closed end of the dough shell. Ordinarily, this slight vacuum does not cause the closed end of the dough shell to open due to the tensile strength of the dough. If the dough is extremely flaky, it may be necessary to provide the piston 95 with a longitudinal bore and a check valve so that the vacuum may be relieved by flow of air through the longitudinal bore past the check valve and into the extrusion tube. The check valve would prevent opposite flow of fluids through such a longitudinal bore. Alternatively, the lug 65 could be made of such arcuate length as to hold the reciprocating plates in closed position holding the outer end of the dough shell tightly closed until the end of the piston 95 moves past the lateral port 93 and opens it.

Figure 4:
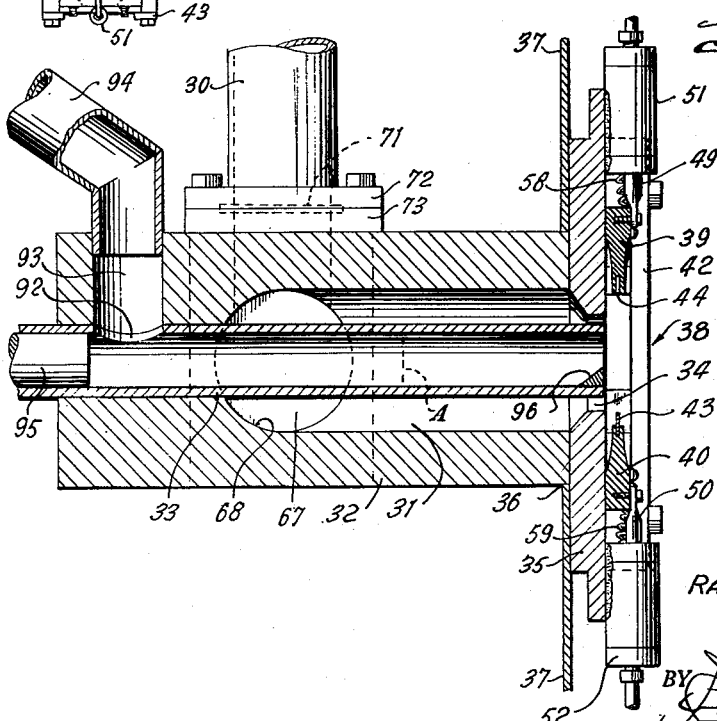
Figure 4 is a vertical sectional view of the filler ejecting and dough extruding mechanism.

The forward end of the filler piston 95 moves between the solid line position and the broken line position A shown in Figure 4 while the dough piston 67 moves between the solid line position and the broken line position B shown in Figure 1. The piston 67 must be of substantial length to prevent its rear end from moving past the vertical bore 69 and thus allowing dough to flow behind it. A cylinder 114 is secured to the extrusion member and the vertical support 77 to support the piston when it is in its extreme outward position.

It will be apparent that the described apparatus is capable of continuous automatic operation to produce filled pastries, such as pies, which may fall from the knife into a chute, not shown, to be conveyed to a kettle of hot oil wherein they are fried. Moreover, the size of such pies and the amounts of the filler contained therein may be varied by placing the pins 104 and 108 in different holes 110 and 111, respectively, so that the lengths of the strokes of the dough piston and the filler piston are changed.

It will also be apparent that the closure member and the pistons are operated intermittently in timed sequence with respect to one another due to the pin and slot connections of the various links to their operating gears or arm.

Manifestly, the construction as shown and described is capable of some modification and such modification as may be construed to fall within the scope and meaning of the appended claims is also considered to be within the spirit and intent of the invention.

What is claimed is:

1. In a machine for producing a food product in an edible casing, an extrusion member having horizontal extrusion chamber extending inwardly from one side thereof and having an open end; a plate affixed to said extrusion chamber having a tapered extrusion orifice in register with but of smaller diameter than the open end of said extrusion chamber; an extrusion tube extending axially through said chamber and having an open end adjacent to and concentric with said open end of the extrusion chamber; a dam adjacent the open end of said extrusion tube, said extrusion member having a longitudinal passage communicating with said extrusion chamber intermediate its ends, a first piston reciprocably movable in said extrusion tube; a second piston reciprocably movable in said passage, a filler container in communication with said tube from which a filler is adapted to flow into said tube for ejection by said first piston through said open end of said tube, a pressurized chamber containing edible casing material and from which said material is adapted to flow into said passage for ejection by said second piston through said passage into said extrusion chamber and thence through said open end of said chamber to compress and form a casing about said tube and moving over and past said open end thereof whereby the filler ejected by said first piston through said open end of said tube is ejected into said casing, reciprocable means periodically interrupting flow of casing material into said passage, means for reciprocating said pistons in sequence to produce extrusions having an edible casing covering a predetermined amount of said filler, and means for sealing and severing extrusions into articles of predetermined lengths.

2. In a machine for producing a food product in an edible casing, an extrusion member having a horizontal extrusion chamber extending inwardly from one side thereof and having an open end of a diameter smaller than that of said chamber, an extrusion tube extending axially through said chamber and having an open end concentric with the open end of the extrusion chamber, said extrusion member having a horizontal passage communicating with said extrusion chamber at right angles thereto, a first piston reciprocably movable in said extrusion tube; a second piston reciprocably movable in said passage, a filler container from which filller is adapted to flow into said tube for ejection by said first piston through said open end of said tube, means in the discharge end of said tube for withholding filler during reverse movement of said first piston, a container for casing material, means for introducing air under pressure into said container to compel said casing material to flow into said passage for ejection by said second piston through said passage into said extrusion chamber and thence through said open end of said chamber to be compressed thereby and formed into a casing disposed about said tube and moving over and past said open end thereof whereby the filler ejected by said first piston through said open end of said tube is ejected into said shell; and means for intermittently moving said pistons in sequence, said first piston having an ejecting movement of shorter duration than that of said second piston and commencing its ejecting movement after commencement of the ejecting movement of said second piston.

3. In a machine for producing a food product in an edible casing, an extrusion member having a horizontal extrusion chamber originating inwardly thereof and terminating in a tapered open end of a diameter less than that of said chamber; an extrusion tube extending axially through said chamber and having an open end concentrically adjacent said open end of the extrusion chamber, said extrusion member having a horizontal passage communicating at right angles with said extrusion chamber, a first piston reciprocably movable in said extrusion tube; a second piston reciprocably movable in said passage, a filler container, means effecting communication between said filler container and said tube for ejection by said first piston through said open end of said tube, a container for casing material, means for introducing air under pressure into said casing material container, an outlet pipe from said container through which said material is compelled to flow into said passage for ejection by said second piston through said passage into said extrusion chamber and thence through said open end of said chamber under compression to form a casing about said tube and moving over and past said open end thereof whereby the filler ejected by said first piston through said open end of said tube is ejected into said casing, a reciprocable closure member for closing said outlet pipe; means for intermittently reciprocating said pistons and intermittently operating said closure member in sequence, and means for severing extruded article in predetermined lengths for sealing the severed ends thereof.

4. In a machine for producing pies, an extrusion member having a horizontal extrusion chamber extending inwardly from one side thereof and having an open end of smaller diameter than said chamber, an extrusion tube extending axially through said chamber and having an open end concentrically adjacent said open end of the extrusion chamber, said extrusion chamber having a longitudinal passage communicating with said extrusion chamber, a dough container, an outlet pipe connecting said container with said passage, means for imposing air pressure in predetermined volume on the dough in said container, a container for pie filler having communication with said extrusion tube, a first piston reciprocably movable in said extrusion tube for ejecting filler through said open end of said tube, said second piston being effective to expel dough through said passage into said extrusion chamber and thence through said open end of said chamber to compress the same and to form a cylindrical body to receive the filler ejected by said first piston, a closure member for periodically interrupting flow of dough from said dough container into said passage, and means for intermittently reciprocating said pistons and intermittently operating said closure member in sequence to produce articles having a dough casing covering a predetermined amount of said filler, said closure member being in closed position during ejecting movement of said second piston, said first piston having an ejecting movement of shorter duration than that of said second piston and commencing its ejecting movement after commencement of the ejecting movement of said second piston.

5. In a machine for producing pies, an extrusion member, an extrusion chamber extending inwardly from one side thereof and having a reduced open end; an extrusion tube concentrically arranged in said chamber and having an open end adjacent that of the extrusion chamber, a dam in the open end of said tube, a longitudinal passage connected with said extrusion chamber, a dough container, means supplying air under pressure to said dough container, an outlet pipe connecting said dough container with said longitudinal passage and through which dough is forced into said passage, a filler container communicating with said tube, a first piston for advancing filler to the open end of said tube, a second piston reciprocably movable in said passage for ejection of dough through said passage into said extrusion chamber and thence through said open end of said chamber to compress the same and to form said dough into a cylinder about said tube, whereby the filler ejected by said first piston through said open end of said tube is ejected into said cylinder of dough, an intermittently operable sealing and cutting means adjacent said open ends for sealing and cutting said filler enclosing cylinder; and means for intermittently reciprocating said pistons and intermittently operating said sealing and cutting means in sequence to produce articles having an outer closed casing of said substance over a predetermined amount of said filler.

References Cited in the file of this patent

UNITED STATES PATENTS

| | | |
|---|---|---|
| 544,962 | Copland | Aug. 20, 1895 |
| 729,933 | Heilmann-Taylor | June 2, 1903 |
| 798,251 | Averay-Jones | Aug. 29, 1905 |
| 1,168,305 | Hood | Jan. 18, 1916 |
| 1,649,308 | Hunter | Nov. 15, 1927 |
| 2,271,767 | Hummel | Feb. 3, 1942 |